(12) United States Patent
Kishi (10) Patent No.: US 8,108,638 B2
(45) Date of Patent: Jan. 31, 2012

(54) BACKUP OF DEDUPLICATED DATA

(75) Inventor: Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 12/367,445

(22) Filed: Feb. 6, 2009

(65) Prior Publication Data

US 2010/0205389 A1     Aug. 12, 2010

(51) Int. Cl.
    *G06F 12/00* (2006.01)
(52) U.S. Cl. ........................................ 711/162
(58) Field of Classification Search .................. None
    See application file for complete search history.

(56) References Cited

U.S. PATENT DOCUMENTS

| | | | |
|---|---|---|---|
| 6,513,051 B1 | 1/2003 | Bolosky et al. | 707/204 |
| 7,921,086 B1 * | 4/2011 | Bromley et al. | 707/692 |
| 2008/0005141 A1 | 1/2008 | Zheng et al. | 707/101 |
| 2008/0016131 A1 | 1/2008 | Sandorfi et al. | 707/204 |
| 2008/0123769 A1 * | 5/2008 | Nakao | 375/267 |
| 2008/0184001 A1 | 7/2008 | Stager | 711/167 |
| 2008/0208933 A1 | 8/2008 | Lyon | 707/204 |
| 2009/0041230 A1 * | 2/2009 | Williams | 380/28 |
| 2010/0121825 A1 * | 5/2010 | Bates et al. | 707/692 |

FOREIGN PATENT DOCUMENTS

| | | |
|---|---|---|
| WO | 9954824 | 10/1999 |
| WO | 03054767 | 7/2003 |

OTHER PUBLICATIONS

Bo Hong et al., "Duplicate Data Elimination in a SAN File System", XP-002474258, (retrieved from Internet on Mar. 28, 2008), pp. 101-114.

You L L et al., "Deep Store: An Archival Storage System Architecture", Data Engineering, 2005 (ICDE 2005), pp. 804-8015.

Bhagwat D et al., "Providing High Reliability in a Minimum Redundancy Archival Storage System", 14th IEEE International Symposium on Modeling, Analysis, and Simulation of Computer and Telecommunication Systems, 2006 (MASCOTS 2006), pp. 413-421.

* cited by examiner

*Primary Examiner* — Hiep Nguyen
(74) *Attorney, Agent, or Firm* — John H. Holcombe (57) ABSTRACT

Methods and systems back up deduplicated data to data storage media, the deduplicated data comprising a plurality of data blocks referenced for deduplication. In one embodiment, the existence of multiple references to each of the data blocks is determined; and at least two copies of at least each data block having multiple references thereto is stored, each to a separate data storage media. In another embodiment, the references to each of the data blocks is determined; the total of multiple references is compared to a percentage threshold; and multiple copies are stored for all the data blocks where the percentage threshold is exceeded.

29 Claims, 10 Drawing Sheets

| | |
|---|---|
| VOL 000 | A B C D E F G H |
| VOL 001 | K I J A L K N O |
| VOL 002 | B A D L H D L D |
| VOL 003 | E B A B I K A N |
| VOL 004 | F D E A A D N O |
| VOL 005 | D B B A M K L M |
| VOL 006 | B I N K L N A |

| | |
|---|---|
| TAPE 1 | A B C D |
| TAPE 2 | E F G H |
| TAPE 3 | I J K L |
| TAPE 4 | M N O |

| TAPE 1 | A B C D |
| TAPE 2 | E F G H |
| TAPE 3 | I J K L |
| TAPE 4 | M N O A |
| TAPE 5 | B D E F |
| TAPE 6 | H I K L |
| TAPE 7 | N O M |

FIG. 8A

| VOLUME | TOTAL OF MULTIPLE REFERENCES |
|---|---|
| VOL 000 | 0 |
| VOL 001 | 2 |
| VOL 002 | 5 |
| VOL 003 | 4 |
| VOL 004 | 4 |
| VOL 005 | 4 |
| VOL 006 | 4 |

FIG. 8B

| TAPE 1 | A B C D |
| TAPE 2 | E F G H |
| TAPE 3 | I J K L |
| TAPE 4 | M N O |
| TAPE 5 | B A D L |
| TAPE 6 | H D L D |
| TAPE 7 | E F I K |
| TAPE 8 | N O |

FIG. 9A

| VOL 000 | A B C D E F G H |
|---|---|
| VOL 001 | K J I A L K |
| VOL 002 | B A D L H D L D |
| VOL 003 | E B A B I K A N |
| VOL 004 | F D E A A D N O |
| VOL 005 | D B B A M K L M |
| VOL 006 | B I N K L K N A |

| TAPE 1 | A B C D |
|---|---|
| TAPE 2 | E F G H |
| TAPE 3 | I K L M |
| TAPE 4 | N O |
| TAPE 5 | K J |
| TAPE 6 | I A L K |
| TAPE 7 | B D E F |
| TAPE 8 | H N |

| TAPE 1 | A B C D |
|---|---|
| TAPE 2 | E F G H |
| TAPE 3 | I J K L |
| TAPE 4 | M N O A |
| TAPE 5 | B D E F |
| TAPE 6 | H I K L |
| TAPE 7 | N O A B |

BACKUP OF DEDUPLICATED DATA

FIELD OF THE INVENTION

This invention relates to data deduplication, and, more particularly, to the backup of deduplicated data to data storage media.

BACKGROUND OF THE INVENTION

Computer systems employ applications that update data from time to time, typically in part. That data is then typically stored, perhaps first to a repository, such as memory or disk, and subsequently to data storage media, such as removable media, examples of which comprise magnetic tape, optical disk, magnetic disk cartridges, memory cartridges, etc. The storage to a repository and to data storage media may be called backup of the data and is conducted by a backup/restore application, as is known in the art. For example, a user or group of users may wish to periodically (e.g., daily or weekly) backup the data of a particular application, or all of the data stored on their computers to a repository as precaution against possible crashes, corruption or accidental deletion of important data.

The partial updates to data streams may result from use of only a part of the data stream by each of various updating applications. In one example, one application or user will use and update one or more data sets or virtual volumes which comprise a portion of the data stream, while another application or user will use and update one or more data sets or virtual volumes which comprise another portion of the data stream. In either case, often only a small part of the data sets or virtual volumes in the data stream being backed up have been updated, and therefore much of the current data can already be found in the repository with only minor changes.

A process to reduce the amount of identical data stored in the repository is called data deduplication, and various techniques are known to those of skill in the art. The net result of data deduplication is that, for portions of the data that are identical, one copy of that portion of the data is stored as a first copy, and other copies are replaced by pointers to the first copy.

Herein, each of the first copy and each of any pointers to the first copy for a given portion of data is called a "reference" for deduplication for that data. The portion of the data that is unique, without identical copies, is also called a "reference" for deduplication for that data.

A deduplicated virtual volume may thus comprise a combination of data blocks that are unique and data blocks that are either first copies or are pointers to first copies. Depending on the technique employed to create the deduplication, the data blocks may be of uniform or variable size.

Deduplicated data is typically stated as being "backed up" in deduplicated form to the repository, and is typically stored on hard disk drive systems, such as RAID, as is known to those of skill in the art. A RAID system employs parity systems to insure that the data is not lost even though a substantial portion of the data may become corrupted, etc. The data may be formatted to emulate magnetic tapes or other form of removable media, but is arranged on the hard disk drive system in such a manner that the original data may be restored quickly. The data stream comprising the virtual volumes may exist as a complete original data stream and be deduplicated as it is backed up to the repository; or may be deduplicated and stored, for example, in temporary storage in deduplicated form, and then backed up to the repository.

The repository itself must be backed up from time to time in order to avoid excessive costs, and the backup is typically to actual removable media, for example, a magnetic tape library. Access to the data is typically required for restoration of the original data, and a library maintains the removable media for quick access, although less quick than that of a disk drive system. When the data is transferred to physical tape, it can be reconstructed for the transfer, in which case it expands and consumes a great deal of tape, for example, the expansion may be by a factor of 10 or 20.

SUMMARY OF THE INVENTION

Methods and systems back up deduplicated data, the deduplicated data comprising a plurality of data blocks referenced for deduplication.

In one embodiment, a step comprises determining the existence of multiple references to each of the data blocks; and a step comprises storing at least two copies of at least each data block having multiple references thereto, each copy of the data block stored to separate data storage media.

In another embodiment, a step comprises determining the references to each of the data blocks; a step comprises comparing the references to a reference threshold; a step comprises storing a single copy of each data block where the reference threshold is not exceeded; and a step comprises storing multiple copies of each data block where the reference threshold is exceeded.

In a further embodiment, the multiple copy storing step comprises storing each copy of the multiple copies of a data block to each of separate data storage media.

In a still further embodiment, the reference threshold comprises a number of references to a data block.

In a still further embodiment, wherein the deduplicated data is arranged in data volumes, with at least one of the data volumes comprising a plurality of data blocks, the determination step determined references to a data block excludes multiple references to a data block in the same data volume.

In another embodiment, wherein the deduplicated data is arranged in data volumes, with at least one of the data volumes comprising a plurality of the data blocks, the determination step determined references to a data block includes multiple references to a data block in the same data volume.

In a further embodiment, the reference threshold number is one reference to a data block.

In another embodiment, the reference threshold comprises a risk based threshold greater than one.

In still another embodiment, backing up deduplicated data comprises a step comprising determining the references to each of the data blocks, for example in a context; a step comprising comparing the total of multiple references in the context to a percentage threshold; and a step comprising storing all of the data blocks of the context, where the percentage threshold is exceeded.

In a still further embodiment, wherein the deduplicated data is arranged in volumes, with at least one of the data volumes comprising a plurality of data blocks; the percentage threshold comprises a percentage of data of a volume having multiple references to data blocks; and the storing step comprises storing all the data blocks of the volume.

In another embodiment, the percentage threshold comprises a percentage of the number of the data blocks of the volume.

In another embodiment, the reference threshold comprises a percentage of the number of the data blocks of the data stream.

In still another embodiment, wherein the deduplicated data comprises a defined data stream comprising a plurality of data volumes; the percentage threshold comprises a percentage of the quantity of data of the context; and the storing step comprises storing all the data of the context.

In a further embodiment, the reference threshold comprises a percentage of the quantity of the deduplicated data of a volume.

In a further embodiment, the reference threshold comprises a percentage of the quantity of the deduplicated data of the data stream.

In still another embodiment, backing up deduplicated data comprises a step comprising determining the references to each of the data blocks; a step comprising comparing the references to a first threshold; a step comprising comparing the references to a second threshold; a step comprising storing a second copy of at least each data block where the first threshold is exceeded; and a step comprising storing a copy in addition to the second copy of at least each data block where the second threshold is exceeded.

In a further embodiment, the multiple copy storing step comprises storing each copy of the second copy of a data block and each copy of the additional copy of a data block to each of separate data storage media.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
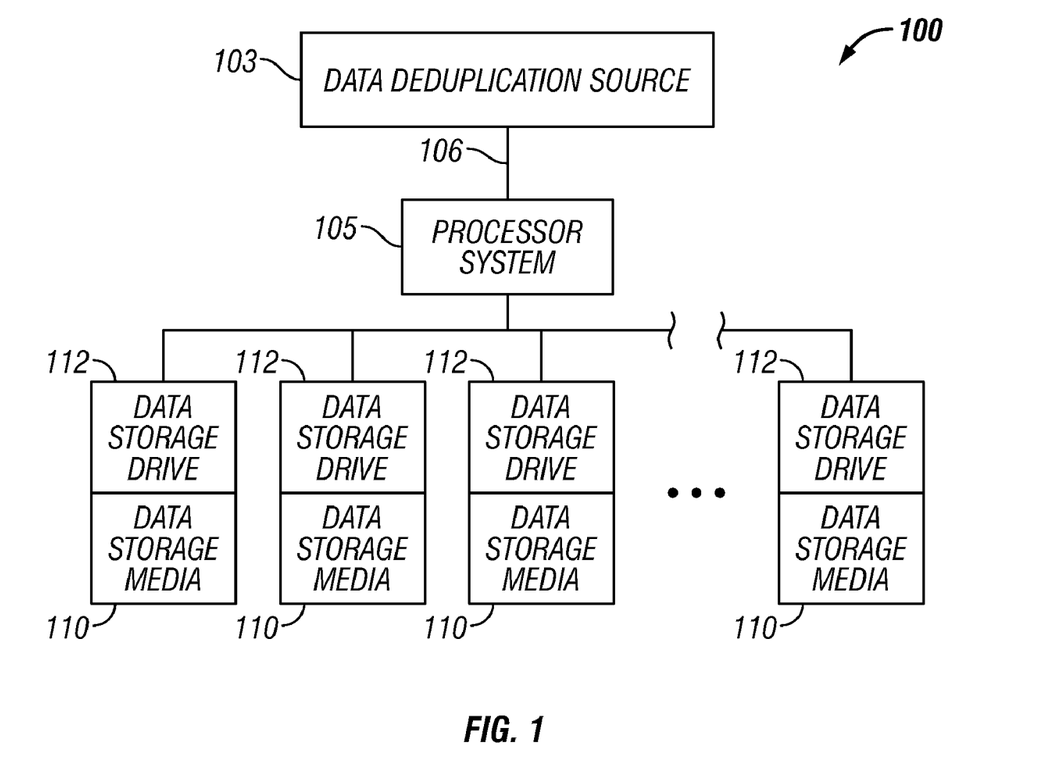
FIG. 1 is a block diagrammatic illustration of a data deduplication source and a system for backing up deduplicated data in accordance with embodiments of the present invention.

Referring to FIG. 1, a system 100 is configured to receive or obtain deduplicated data from a data deduplication source 103. The data deduplication source may comprise a host system or repository of any suitable type that generates or provides deduplicated virtual volumes that may comprise a combination of data blocks that are unique and data blocks that are either first copies or are pointers to first copies, as discussed above. Depending on deduplication choices and techniques, the data blocks may be the same or similar in size or may comprise various sizes. Examples of host systems or repositories 103 comprise user computer systems, application servers, storage servers, etc., capable of communication with other devices.

The system 100 comprises a processor system 105 capable of communication with respect to the data deduplication source 103 over one or more communication links 106. The processor system 105 comprises one or more processors, as discussed hereinafter, and associated systems, devices or elements, for handling deduplicated data and causing data to be stored on data storage media 110, for example, by data storage drives 112. In one example, the data storage media 110 are provided in an automated data storage library, either one at a time to a single data storage drive 112, or at substantially the same time to a plurality of data storage drives, or a combination. Alternatively, the data storage drive(s) 112 may be standalone or part of a system, such as a rack system, and employ automatic or manual loading to place the data storage media 110 in the data storage drive(s).

The data storage media 110 may comprise any type of media on which data may be stored, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of removable media that is widely employed, for example in automated data storage libraries for mass data storage, is a magnetic tape cartridge in which the media is magnetic tape.

The data storage drive 112 is suitable for storing data to, and retrieving data from, the data storage media 110, and, may be a separate element from the media, or may be a common element with the media. An example of separate elements comprises a magnetic tape drive and removable magnetic tape cartridge, and an example of common elements comprises a removable hard disk drive.

As discussed above, data deduplication comprises various techniques to reduce the amount of identical data stored in a repository. The net result of data deduplication is that, for portions of the data that are identical, one copy of that portion of the data is stored as a first copy, and other copies are replaced by pointers to the first copy.

Herein, each of the first copy and each of any pointers to the first copy for a given portion of data is called a "reference" for deduplication for that data. The portion of the data that is unique, without identical copies, is also called a "reference" for that data, but would be a single reference.

A deduplicated virtual volume may thus comprise a combination of data blocks that are unique and data blocks that are either first copies or are pointers to first copies. Depending on the technique employed to create the deduplication, the data blocks may be of uniform or variable size.

The deduplicated data may be stored in the repository and be considered as "backed up", but the repository is unlikely to hold the entire continuum of a data stream covering an extended period. Instead, the data stream is occasionally or periodically backed up itself, for example, to a mass data storage such as a magnetic tape library or to a magnetic tape system.

A risk of loss, although typically small, exists with respect to backed up data, including data that is deduplicated. If the data is backed up to multiple data storage media, such as removable media, the risk is usually limited to individual data storage media. If deduplicated data is stored without being reconstructed, for example, a loss of a single data storage media that contains the actual data of a piece that is pointed to by objects throughout the remainder of the data stream, has the potential of preventing reconstruction of those objects, effectively preventing reconstruction of the entire data stream.

Figure 2:
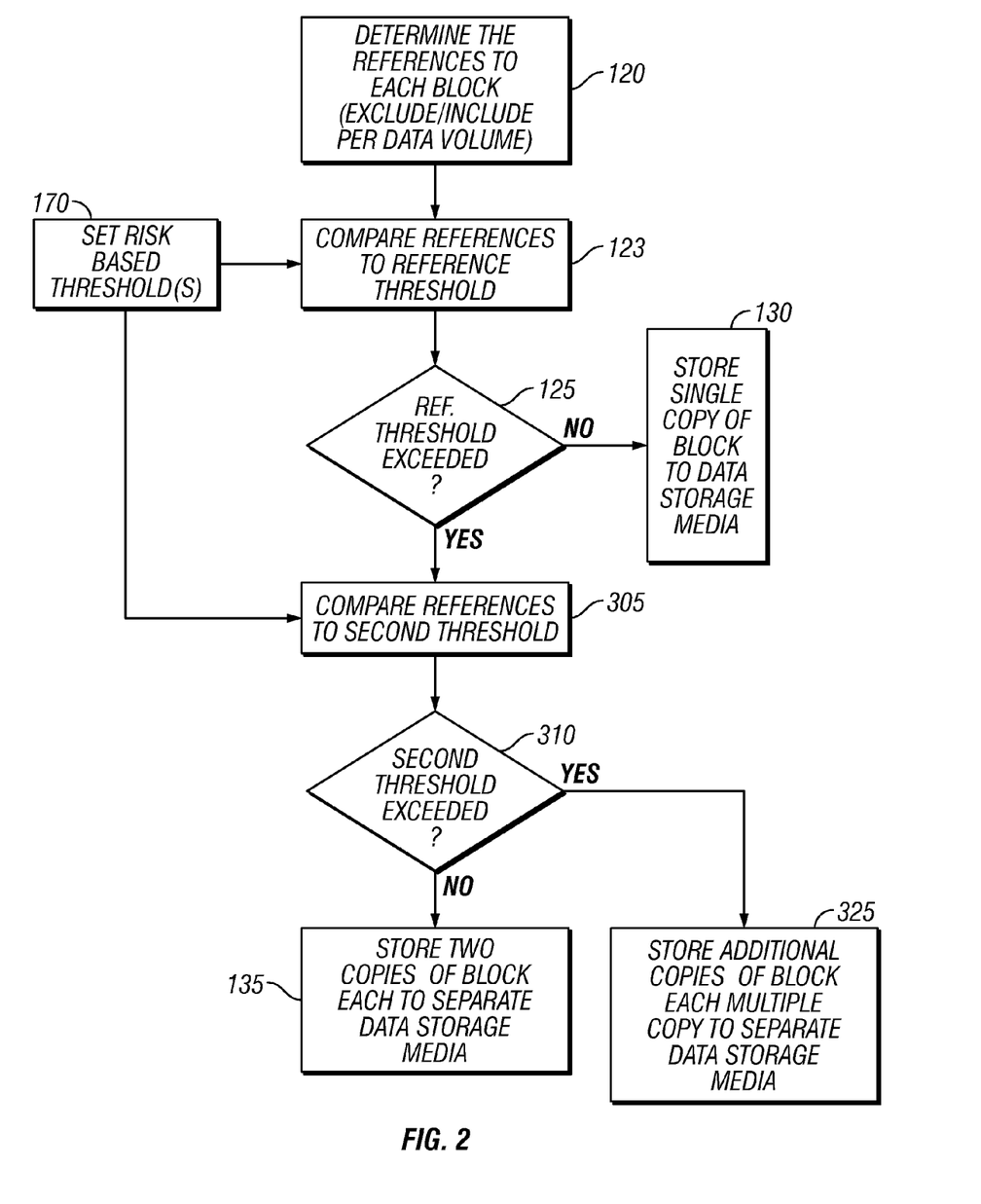
FIG. 2 is a flow chart depicting embodiments of the present invention for backing up deduplicated data.
Figure 3:
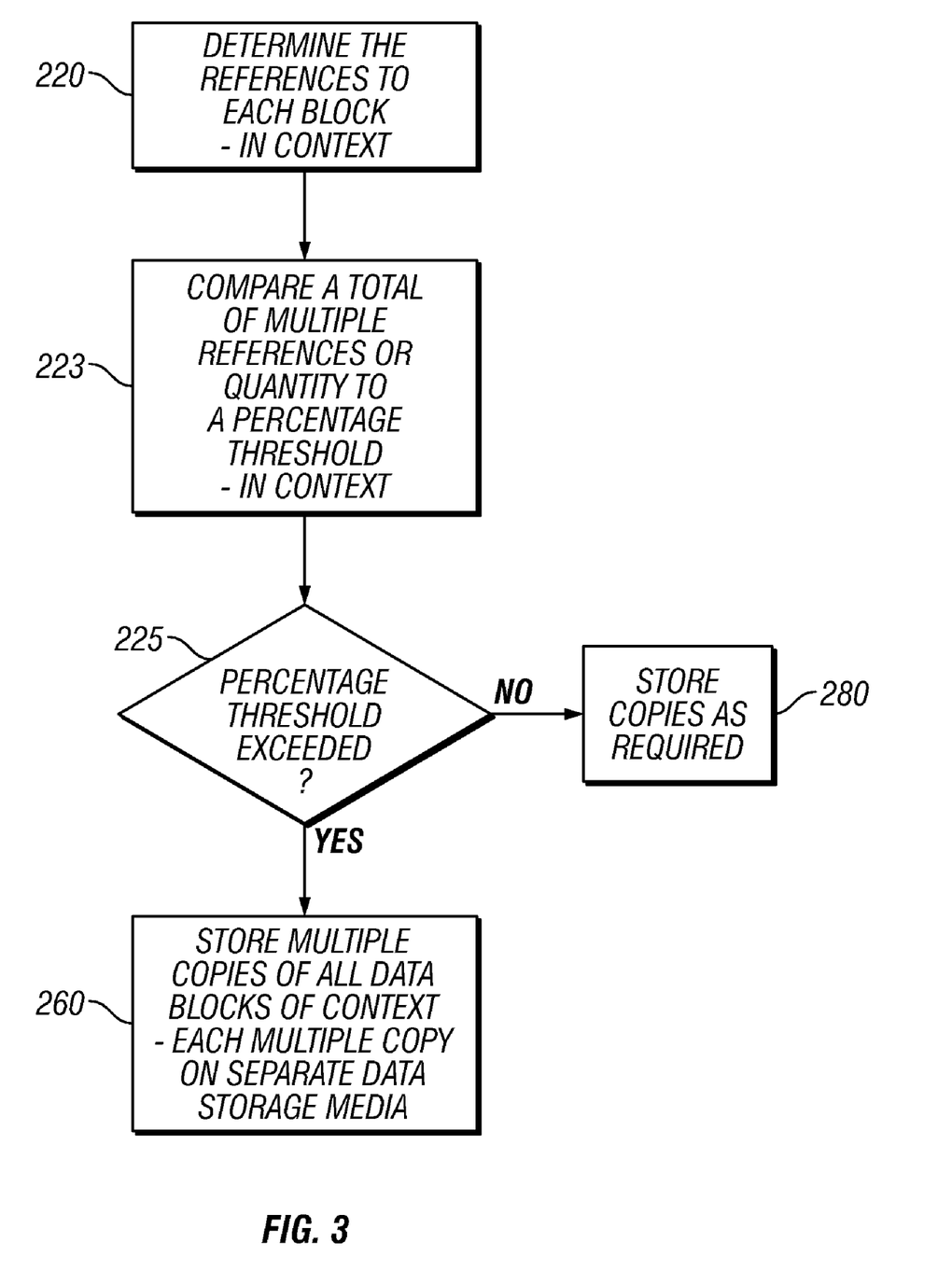
FIG. 3 is a flow chart depicting embodiments of the present invention for backing up deduplicated data.

Referring to FIGS. 1 and 2, embodiments of the present invention are presented for backing up deduplicated data without reconstructing the data, and with a reduced likelihood of loss, for example, when some or all of the data of an individual data storage media is lost.

In one embodiment, steps 120, 123 and 125, together, comprise a single step of determining the existence of multiple references to each of the data blocks of the data stream received from the data deduplication source 103. If there is only a single reference, the data block is unique to the data stream and, in step 130, a single copy of the data block is stored. If, however, there are multiple references to the data block, after some optional steps, at least two copies of at least each data block having multiple references thereto are stored, for example in step 135, and each of the copies is stored to separate data storage media 110.

Figure 4A:
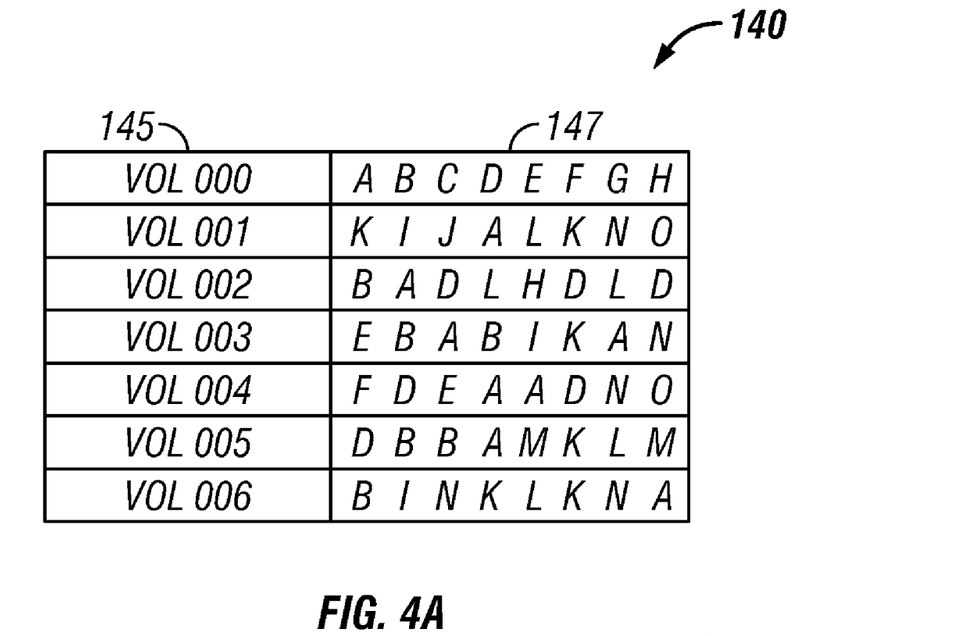
FIGS. 4A, 4B and 4C are diagrams illustrating embodiments of deduplicated data and the backup of deduplicated data.
Figure 4B:
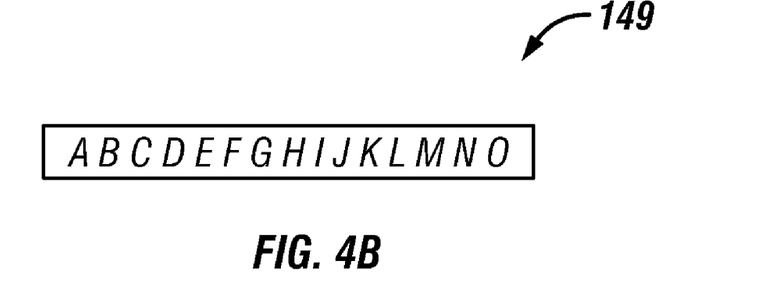
Figure 4C:
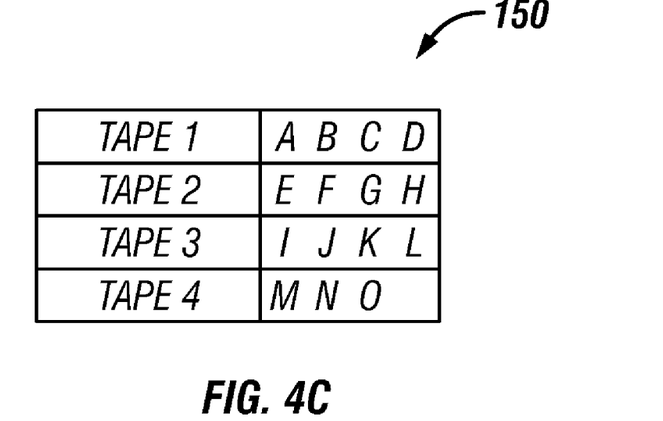

Referring additionally to FIGS. 4A, 4B and 4C, FIG. 4A illustrates a representation of an exemplary data stream 140 arranged in volumes 145. The representation may be a representation of an original data stream before deduplication. Alternatively, the representation may be a representation of the references for the data stream. In the example, the data stream 140 comprises a total of references to 56 data blocks 147, many of which are duplicates. FIG. 4B represents a single copy of each of the data blocks 149 that make up the data stream 140, comprising 15 data blocks. The deduplicated data stream may also be represented by FIG. 4A, in which each data block 147 is a reference to one of the copies 149.

If the single copy of each of the data blocks 149 is written to magnetic tapes, the tapes might appear as tapes 150 of FIG. 4C.

Figure 5:
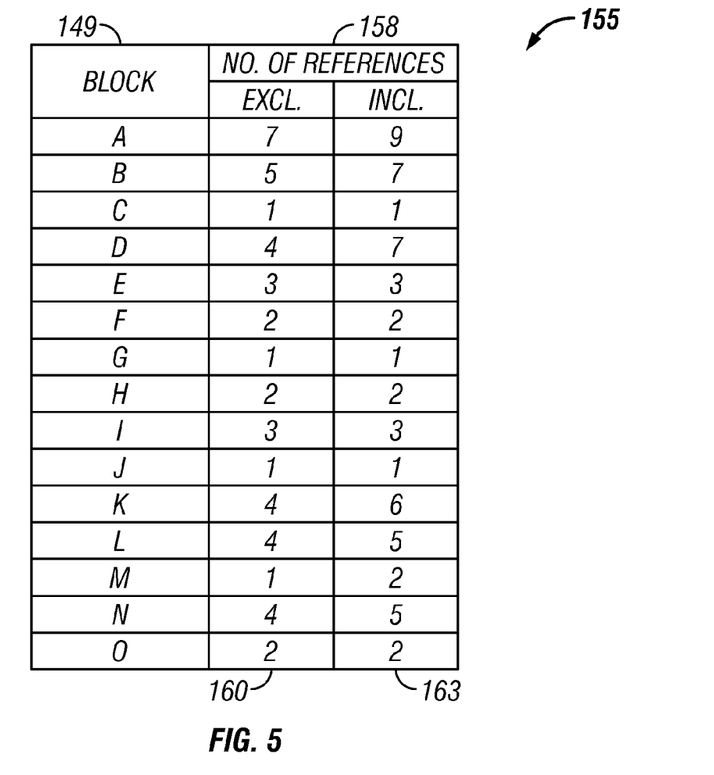
FIG. 5 is a diagram illustrating properties of the deduplicated data.

Referring to FIGS. 1, 2, 4A and 5, in step 120, the processor system 105 determines the references to each of the data blocks. In FIG. 5, the listing 155 represents step 120 where the data blocks 149 are listed and the number of references 158 to each data block from step 120 is also listed.

In one embodiment, the number of references 160 excludes references that are multiple identical references 147 in the same volume 145. Instead, the multiple references are counted as one reference.

In another embodiment, the number of references 163 includes references that are multiple identical references 147 in the same volume 145.

Figure 6A:
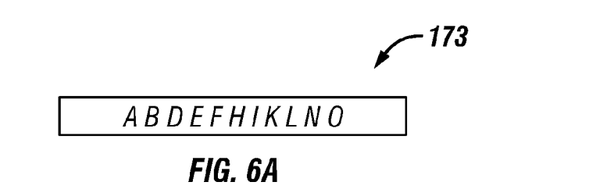
FIGS. 6A and 6B are diagrams illustrating embodiments of the backup of deduplicated data in accordance with the present invention.
Figure 6B:
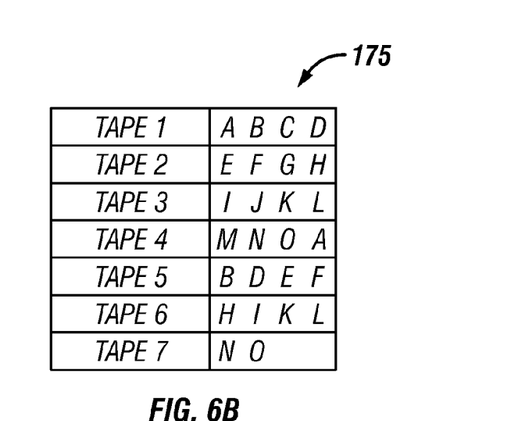

Referring additionally to FIGS. 6A and 6B, steps 123 and 125 are represented, comprising comparing the references to a reference threshold and whether the threshold is exceeded. The number of references 147 is determined for each of the data blocks 149, and that number is illustrated in column 160 for references excluding multiple references in the same volume, and is illustrated in column 163 for references including multiple references in the same volume. For example, block D is referenced once in volume 000, three times in volume 002, twice in volume 004, and once in volume 005. Thus, the references determined in step 120 for block D are 4 in column 160 counting once per volume, and are 7 in column 163 counting every reference.

The threshold of step 123, in an optional step, may be set in step 170. The threshold with the least risk is "1", meaning that any time the threshold is exceeded, "2" or greater, at least two copies of the data block are stored to the data storage media, each to a separate data storage media. Thus, should the data on one of the data storage media become corrupted, etc., one of the volumes 145 may be lost, but another copy is available to insure that other volumes remain intact. For example, FIG. 6A represents the second copies 173 of each of the data blocks 149 whose references exceed the "1" threshold of steps 123 and 125, excluding the multiple references in the same volume, comprising 11 data blocks. The resultant data storage media obtained in step 135 are illustrated in FIG. 6B as data storage media 175 where the first set of copies of all the data blocks 149 are stored, followed by a set of second copies of all the data blocks 173 that have multiple references outside the same volume.

In a risk based approach, step 170 may be employed, for example by a user, to reduce the number of data storage media by setting a higher number. The risk is that loss of a single data storage media could impact more than one volume. Examples will be discussed hereinafter.

Figure 7A:
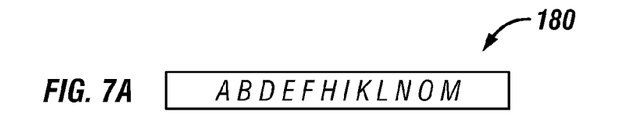
FIGS. 7A and 7B are diagrams illustrating embodiments of the backup of deduplicated data in accordance with the present invention.
Figure 7B:
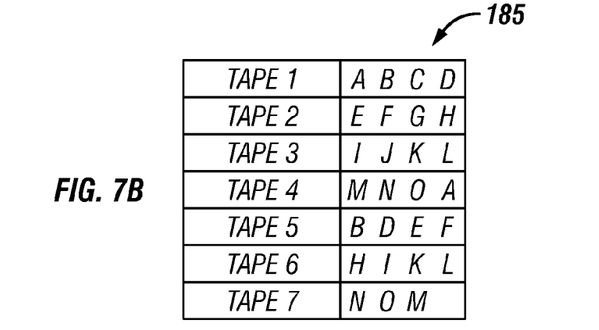

Referring additionally to FIGS. 7A and 7B, steps 123 and 125 are represented, comprising comparing the references to a reference threshold and whether the threshold is exceeded, where every reference is counted, including multiple references within a volume. The number of references 147 is determined for each of the data blocks 149, and that number is illustrated in column 163 for references including multiple references in the same volume. For example, block M is referenced twice in volume 005 145, and is not referenced in any other volume. Thus, the references determined in step 120 for block M is 1 in column 160 counting once per volume, and are 2 in column 163 counting every reference.

Thus, with a threshold of step 123 of "1", the threshold is not exceeded if the multiple references are excluded, but is exceeded if every reference is counted. FIG. 7A represents the second copies 180 of each of the data blocks 149 whose references exceed the "1" threshold of step 123, including the multiple references in the same volume, comprising 12 data blocks, now including block M. The resultant data storage media obtained in step 135 are illustrated in FIG. 7B as data storage media 185 where the first set of copies of all the data blocks 149 are stored, followed by a set of second copies of all the data blocks 180 that have multiple total references.

Figure 8A:
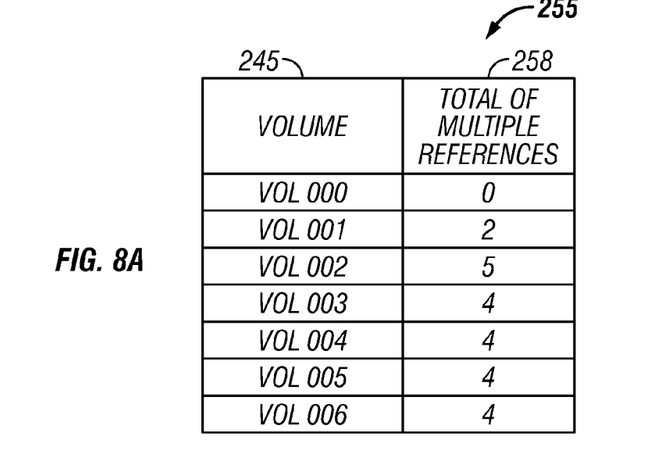
FIGS. 8A and 8B are diagrams illustrating embodiments of the backup of deduplicated data in accordance with the present invention.

In alternative embodiments, referring to FIGS. 1, 3, 4A, 8A and 8B, in step 220, the processor system 105 determines the references to each of the data blocks, for example in context. In one embodiment, a context is a volume 145. In another embodiment, a context is the entire data stream. In steps 223 and 225, the total of multiple references in the context is compared to a percentage threshold. In one example, the threshold may be 50% of the data blocks. In FIG. 8A, the listing 255 represents step 220 where the context being used, for example, volumes 245, are listed and the number of multiple references 258 to data blocks in the context of each volume from step 220 is also listed.

a. For example, using a percentage threshold of 50%, only volume 002 has total multiple references exceeding the threshold, as illustrated in FIG. 4A 147 where there are three references to data block D and two references to data block L for a total of five out of a total of eight references.

In accordance with one embodiment, potential restoration of the data will be much easier and faster if the entire data context is directly copied to data storage media in step 260, as opposed to reconstructing the data of the context. Step 260 comprises storing all of the data blocks of the context.

Figure 8B:
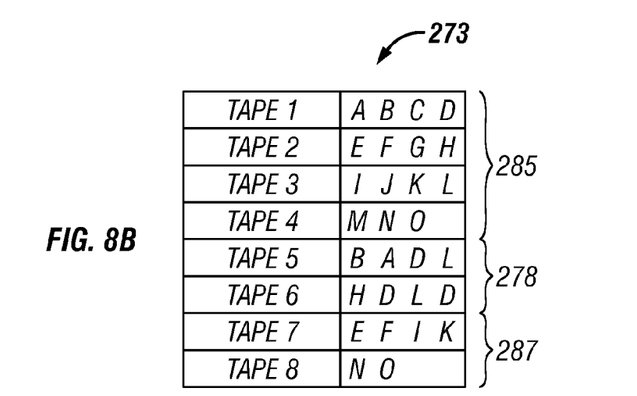

FIG. 8B represents the data storage media 273 with direct copies 278 of all of the data blocks of the context of volume 002 stored in "TAPE 5" and in "TAPE 6". Step 225 indicated that the other volumes did not exceed the threshold, and copies thereof are stored in step 280 as required. In one example, the copies for the remainder of the volumes are treated in accordance with one of the embodiments of FIG. 2. In one example, the resultant data storage media obtained in step 135 are illustrated in FIG. 8B as data storage media 285 where the first set of copies of all the data blocks 149 are stored, followed by a set of second copies stored on data storage media 287 of all the data blocks 173 other than those stored in media 278 that have multiple references outside the same volume.

In another embodiment, the percentage threshold context may comprise the entire data stream 147 of FIG. 4A, and the percentage may be such that a significant percentage of multiple references to data is employed. When exceeded, the threshold will require storage of the entire data stream.

Figure 9A:
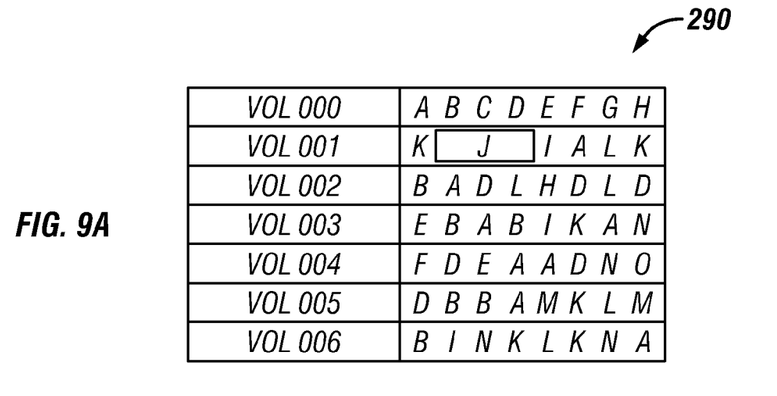
FIGS. 9A and 9B are diagrams illustrating embodiments of deduplicated data and the backup of deduplicated data.
Figure 9B:
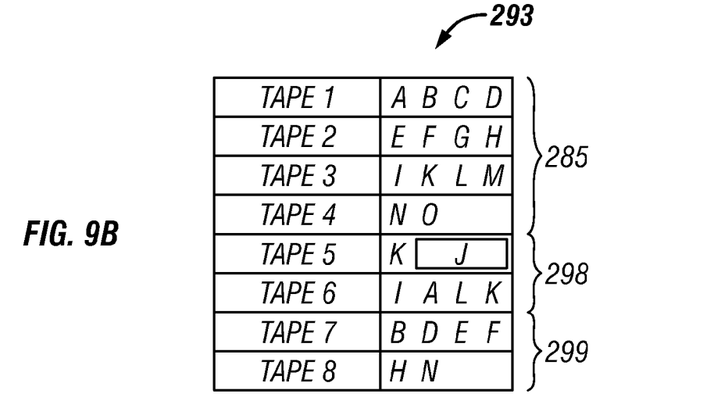

An alternative percentage threshold may comprise a percentage of the quantity of the deduplicated data of the context, such as a data volume or a data stream. Referring additionally to FIGS. 9A and 9B, volume 001 of data stream 290 is illustrated as having a block J of extraordinary quantity of data. For example, the block may comprise over 35% of the quantity of the volume, as determined in step 220.

In steps 223 and 225, the total quantity of data of individual references in the context is compared to a percentage threshold. In one example, the threshold may be 30% of the quantity of data of the context. In FIG. 9A, using a percentage threshold of 30%, volume 001 has a block with a quantity of data exceeding the threshold. In accordance with one embodiment, potential restoration of the data will be much easier and faster if the entire data context is directly copied to data storage media in step 260, as opposed to reconstructing the data of the context. Step 260 comprises storing all of the data blocks of the context to the data storage media.

FIG. 9B represents the data storage media 293 with direct copies 298 of all of the data blocks of the context of volume 001 stored in "TAPE 5" and in "TAPE 6". Step 225 indicated that the other volumes did not exceed the threshold, and copies thereof are stored in step 280 as required. In one example, the copies for the remainder of the volumes are treated in accordance with one of the embodiments of FIG. 2. In one example, the resultant data storage media obtained in step 135 are illustrated in FIG. 9B as data storage media 285 where the first set of copies of all the data blocks are stored, followed by a set of second copies stored on data storage media 299 of all the data blocks 290 other than those stored in media 298 that have multiple references outside the same volume.

Referring to FIGS. 1, 2, 5, 10A and 10B, two thresholds may be employed in one embodiment. Exceeding the first threshold of step 125 may lead to step 305 where the references are compared to a second threshold. In one embodiment, exceeding the first threshold may relate to step 135 where a second copy of a block is stored, and the second copy is stored to a separate data storage media from the first copy. Exceeding the second threshold in step 310 may lead to step 325 to store additional copy of a block to a still separate data storage media. In FIG. 5, the first threshold in one example may comprise "1" and the threshold is exceeded by having multiple references to the data block, so that at least two copies of at least each data block having multiple references thereto are to be stored. The threshold for steps 305 and 310 may, for example comprise "4" so that the threshold is exceeded only upon there being five or more references to a data block, excluding multiple references within a volume.

Figure 10A:
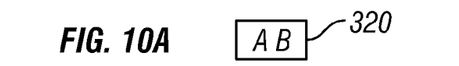
FIGS. 10A and 10B are diagrams illustrating embodiments of the backup of deduplicated data in accordance with the present invention.
Figure 10B:
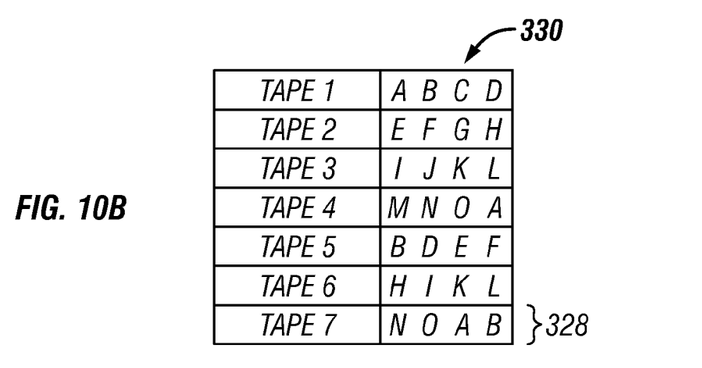

In FIG. 10A, for example, blocks A and B are the only blocks having the number of references to exceed the threshold, and, in step 325, each of the copies is stored to a still separate data storage media 110 as illustrated by data storage media 328 of the media 330 of FIG. 10B.

The first and second thresholds may comprise any of the thresholds discussed herein in any order.

FIG. 10A also illustrates a risk based threshold that may be selected, for example, by a user in step 170 of FIG. 2.

With a risk based threshold, the threshold is greater than "1", meaning that only a single copy of each of the data blocks that are referenced more than once, but equal to or less than the threshold are stored to the data storage media. Thus, should the data on one of the data storage media become corrupted, etc., it is possible that more than one of the volumes 145 may be lost, because no other copy is available to insure that other volumes remain intact. For example, FIG. 10A represents the only blocks A and B for which second copies 173 of each of the data blocks 149 whose references exceed an exemplary threshold of "4" threshold of steps 123 and 125, excluding the multiple references in the same volume.

The risk based approach may require significantly less data storage media, and reduce cost. The tradeoff of reduced cost to the risk that loss of a single data storage media could impact more than one volume may be worthwhile in some circumstances.

Figure 11:
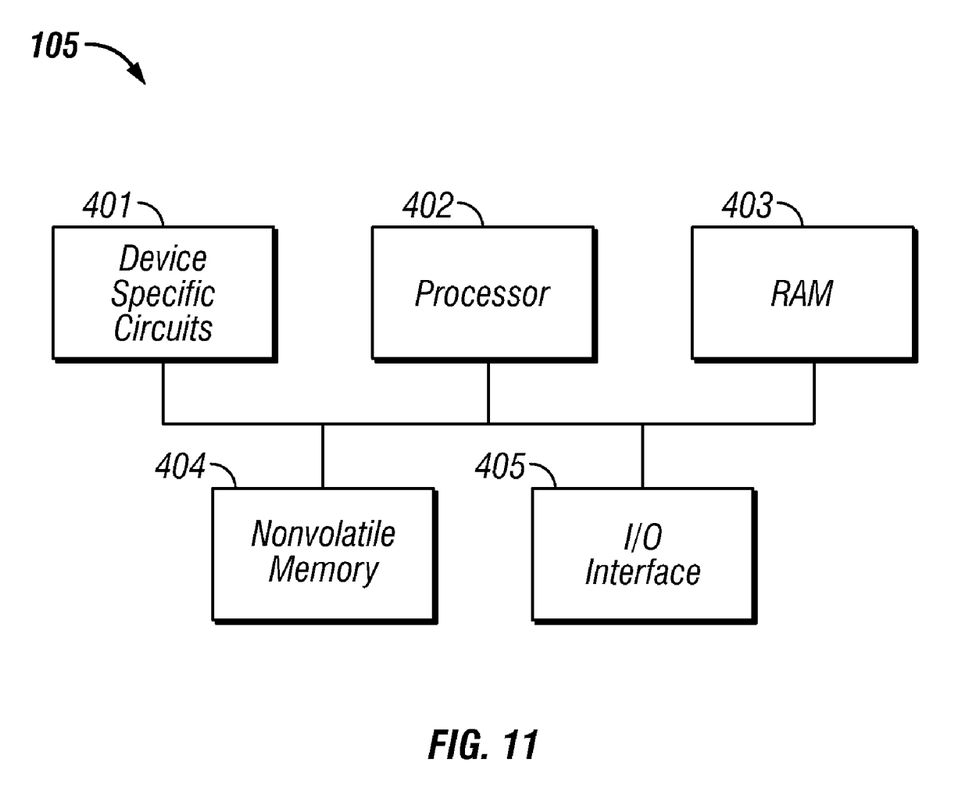
FIG. 11 is a block diagram depicting an exemplary processor system of FIG. 1.

Referring to FIGS. 1 and 11, a processor system may take many different forms and may comprise, for example but not limited to, an embedded system, a distributed control system, a personal computer, or a workstation. Essentially, the term "processor system" as used herein is intended in its broadest sense as a device that contains at least one processor, as such term is defined herein. FIG. 11 shows an example of a processor system 105 with a processor 402, RAM (Random Access Memory) 403, nonvolatile memory 404 and I/O interface 405. In some embodiments, the processor system 105 may also comprise device specific circuits 401. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the processor system. Examples may comprise, but are not limited to, serial interfaces such as RS-232, USB (Universal Serial Bus) or SCSI (Small Computer Systems Interface).

The device specific circuits 401 provide additional hardware to enable the processor system 105 to perform unique functions such as, but not limited to, operation of an element of an automated data storage library. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the processor system 105.

Figure 12A:
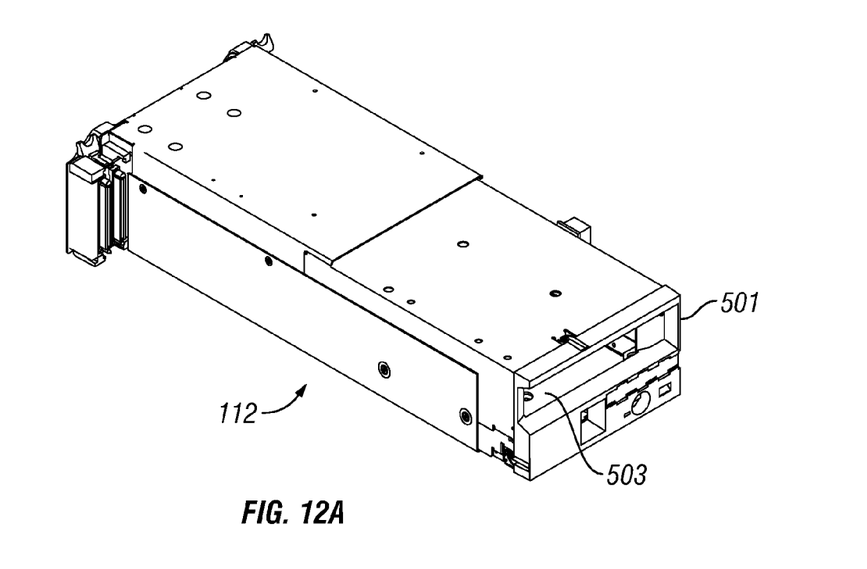
FIGS. 12A and 12B are isometric views of the front and rear of a data storage drive of FIG. 1.
Figure 12B:
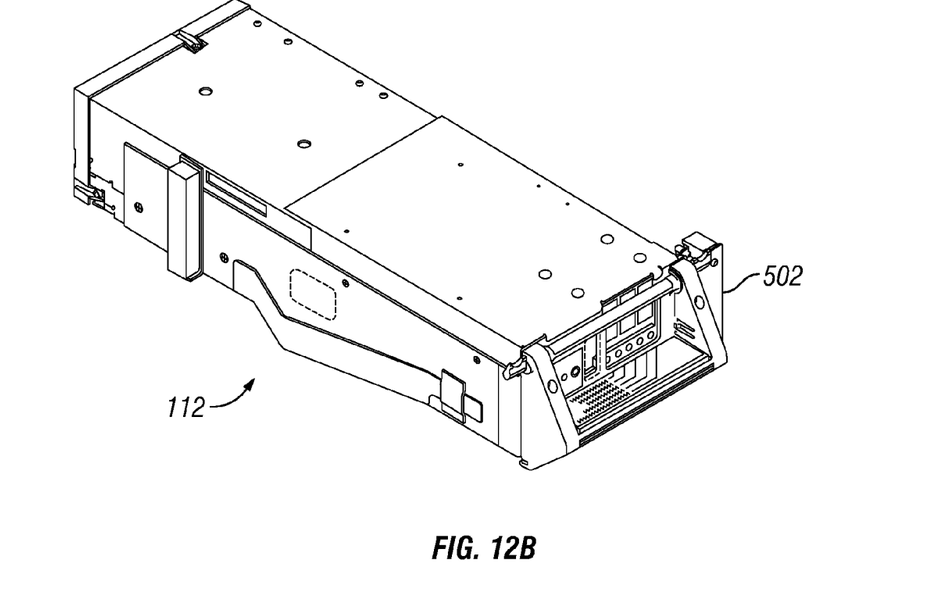

FIGS. 12A and 12B illustrate an embodiment of the front 501 and rear 502 of a data storage drive 112. In the example, the data storage drive comprises a magnetic tape drive. This is only an example, and is not meant to limit the invention to magnetic tape drives. Examples of alternative data storage drives 112 may comprise optical disk drives, hot swap magnetic disk drives, floppy disk drives, etc. In the example, a magnetic tape data storage cartridge may be placed into the data storage drive 112 at opening 503. A data storage drive is employed to read and/or write data with respect to the data storage media 110, and additionally to communicate with the processor system 105. The data storage drive may additionally communicate with a memory which is separate from the media and is located within the cartridge.

Figure 13:
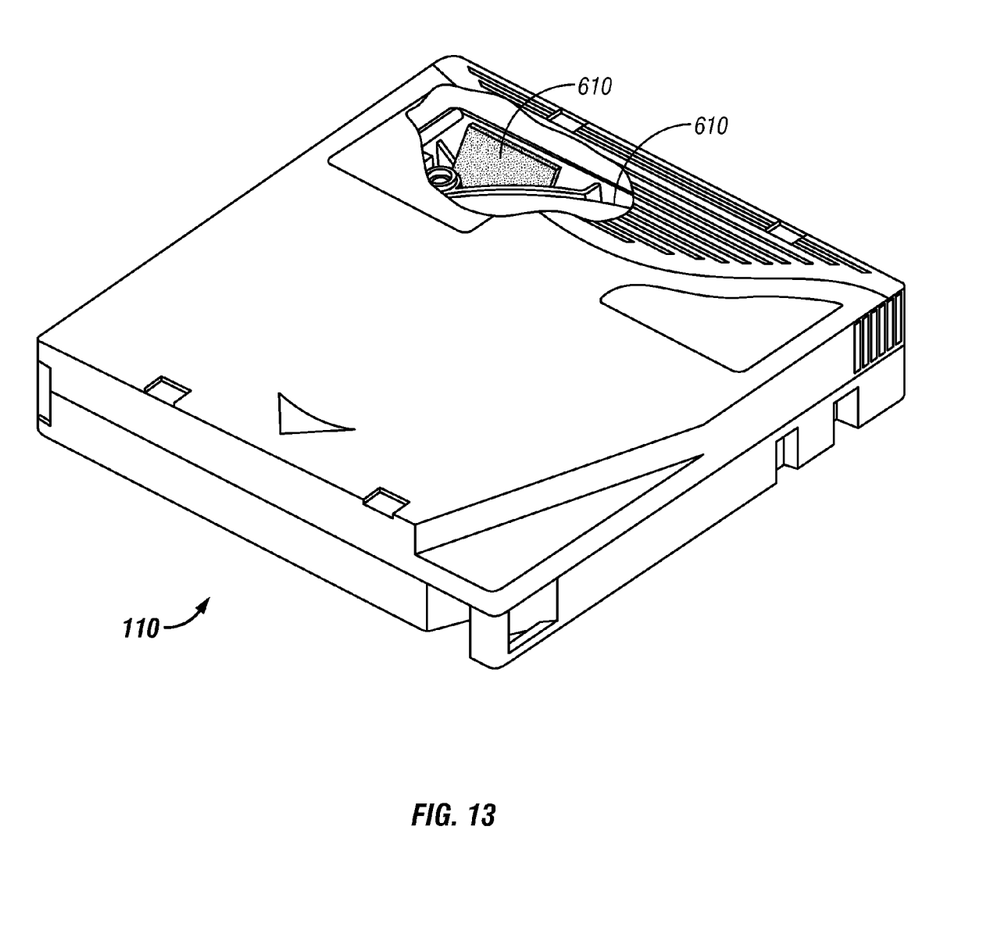
FIG. 13 is an isometric view of a data storage media cartridge of FIG. 1.

FIG. 13 illustrates an embodiment of a data storage media 110 such as a data storage cartridge. Media of a data storage cartridge may comprise any type of media on which data may be stored, including but not limited to magnetic media (such as magnetic tape or disks), optical media (such as optical tape or disks), electronic media (such as PROM, EEPROM, flash PROM, CompactFlash™, Memory Stick™, etc.), or other suitable media. An example of data storage media that is employed in automated data storage libraries for mass data storage is magnetic tape media 620 of a magnetic tape cartridge. The magnetic tape cartridge may also comprise a cartridge memory 610 separate from the magnetic tape media 620. The cartridge memory typically stores information regarding the cartridge, and the information may include that the cartridge is storing deduplicated data.

The invention can comprise a computer program product in the form of a computer usable or computer readable storage medium providing program code for use by or in connection with a computer or any instruction execution system. The medium can be an electronic, magnetic, optical, electromagnetic, infrared, or semiconductor system (or apparatus or device). Examples of a computer readable storage medium include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W) and DVD.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for backing up deduplicated data from a deduplicated data source, said deduplicated data comprising a plurality of data blocks referenced for deduplication, comprising:
   a step performed by a processing system comprising determining the existence of multiple references to each of said data blocks; and
   a step performed by a processing system comprising storing at least two copies of at least each said data block having multiple references thereto, each copy of said data block stored to separate data storage media.

2. A method for backing up deduplicated data from a deduplication source, said deduplicated data comprising a plurality of data blocks referenced for deduplication, comprising:
   a step performed by a processing system comprising determining the references to each of said data blocks;
   a step performed by a processing system comprising comparing said references to a reference threshold;
   a step performed by a processing system comprising storing a single copy of each said data block where said reference threshold is not exceeded; and
   a step performed by a processing system comprising storing multiple copies of each said data block where said reference threshold is exceeded.

3. The method of claim 2, wherein said multiple copy storing step performed by a processing system comprises storing each copy of said multiple copies of a data block to each of separate data storage media.

4. The method of claim 3, wherein said reference threshold comprises a number of references to a data block.

5. The method of claim 4, wherein said deduplicated data is arranged in data volumes, at least one of said data volumes comprising a plurality of said data blocks, and wherein said determined references to a data block of said determination step excludes multiple references to a data block in the same said data volume.

6. The method of claim 4, wherein said deduplicated data is arranged in data volumes, at least one of said data volumes comprising a plurality of said data blocks, and wherein said determined references to a data block of said determination step includes multiple references to a data block in the same said data volume.

7. The method of claim 4, wherein said reference threshold number is one reference to a data block.

8. The method of claim 3, wherein said reference threshold comprises a risk based threshold greater than one.

9. A method for backing up deduplicated data from a deduplication source, said deduplicated data comprising a plurality of data blocks referenced for deduplication, comprising:
   a step performed by a processing system comprising determining the references to each of said data blocks in a context;
   a step performed by a processing system comprising comparing the total of multiple said references in said context to a percentage threshold; and
   a step performed by a processing system comprising storing all of said data blocks of said context, where said percentage threshold is exceeded.

10. The method of claim 9, wherein said deduplicated data is arranged in data volumes, at least one of said data volumes comprising a plurality of said data blocks; wherein said percentage threshold comprises a percentage of data of a volume having multiple references to data blocks; and wherein said storing step performed by a processing system comprises storing all said data blocks of said volume.

11. The method of claim 10, wherein said percentage threshold comprises a percentage of the number of said data blocks of said volume.

12. The method of claim 9, wherein said deduplicated data comprises a defined data stream comprising a plurality of data volumes; wherein said percentage threshold comprises a percentage of data of said data stream having multiple references to data blocks; and wherein said storing step performed by a processing system comprises storing all of said data of said data stream.

13. A method for backing up deduplicated data from a deduplication source, said deduplicated data comprising a plurality of data blocks referenced for deduplication, comprising:
   a step performed by a processing system comprising determining the quantity of data of references to each of said data blocks in a context;
   a step performed by a processing system comprising comparing the quantity of the data of said context to a percentage threshold; and
   a step performed by a processing system comprising storing all of said data blocks of said context, where said percentage threshold is exceeded.

14. The method of claim 13, wherein said deduplicated data is arranged in data volumes; wherein said percentage threshold comprises a percentage of quantity of data of a volume; and wherein said storing step performed by a processing system comprises storing all said data blocks of said volume.

15. The method of claim 13, wherein said deduplicated data comprises a defined data stream comprising a plurality of data volumes; wherein said percentage threshold comprises a percentage of the quantity of deduplicated data of said data stream; and wherein said storing step performed by a processing system comprises storing all of said data of said data stream.

16. A method for backing up deduplicated data from a deduplication source, said deduplicated data comprising a plurality of data blocks referenced for deduplication, comprising:
   a step performed by a processing system comprising determining the references to each of said data blocks;
   a step performed by a processing system comprising comparing said references to a first threshold;
   a step performed by a processing system comprising comparing said references to a second threshold;
   a step performed by a processing system comprising storing a second copy of at least each said data block where said first threshold is exceeded; and
   a step performed by a processing system comprising storing a copy in addition to said second copy of at least each said data block where said second threshold is exceeded.

17. The method of claim 16, wherein said multiple copy storing step performed by a processing system comprises storing each copy of said second copy of a data block and each copy of said additional copy of a data block to each of separate data storage media.

18. A system comprising:
   at least one data storage drive configured to store data to at least one data storage medium; and
   a processor system configured to back up deduplicated data to a plurality of separate data storage media via said at least one data storage drive, said deduplicated data comprising a plurality of data blocks referenced for deduplication, said processor system configured to:
   determine for each of said data blocks whether multiple said references exist with respect to said data block; and
   store at least two copies of at least each said data block having multiple references thereto, each copy of said data block stored to separate data storage media.

19. A system comprising:
   at least one data storage drive configured to store data to at least one data storage medium; and
   a processor system configured to back up deduplicated data to a plurality of separate data storage media via said at least one data storage drive, said deduplicated data comprising a plurality of data blocks referenced for deduplication, said processor system configured to:
   determine the references to each of said data blocks;
   compare said references to a reference threshold;
   store a single copy to a data storage media of each said data block where said reference threshold is not exceeded; and
   store a separate copy to each of separate data storage media of each said data block where said reference threshold is exceeded.

20. The system of claim 19, wherein said reference threshold comprises a number of references to a data block; wherein said deduplicated data is arranged in data volumes, at least one of said data volumes comprising a plurality of said data blocks, and wherein said processor system is configured to determine references to a data block excluding multiple references to a data block in the same said data volume.

21. The system of claim 19, wherein said reference threshold comprises a number of references to a data block; wherein said deduplicated data is arranged in data volumes, at least one of said data volumes comprising a plurality of said data blocks, and wherein said processor system is configured to determine references to a data block including multiple references to a data block in the same said data volume.

22. A system comprising:
   at least one data storage drive configured to store data to at least one data storage medium; and
   a processor system configured to back up deduplicated data to a plurality of separate data storage media via said at least one data storage drive, said deduplicated data comprising a plurality of data blocks referenced for deduplication, said processor system configured to:
   determine the references to each of said data blocks in a context;
   compare the total of multiple said references in said context to a percentage threshold; and
   store all of said data blocks of said context, where said percentage threshold is exceeded.

23. The system of claim 22, wherein said deduplicated data is arranged in data volumes, at least one of said data volumes comprising a plurality of said data blocks; wherein said percentage threshold comprises a percentage of data of a volume having multiple references to data blocks; and wherein said processor system is configured to store all said data blocks of said volume where said percentage threshold is exceeded.

24. The system of claim 23, wherein said percentage threshold comprises a percentage of the number of said data blocks of said volume.

25. The system of claim 22, wherein said deduplicated data comprises a defined data stream comprising a plurality of data volumes; wherein said percentage threshold comprises a percentage of data of said data stream having multiple references to data blocks; and wherein said processor system is configured to store all said data of said data stream where said percentage threshold is exceeded.

26. A system comprising:
   at least one data storage drive configured to store data to at least one data storage medium; and
   a processor system configured to back up deduplicated data to a plurality of separate data storage media via said at least one data storage drive, said deduplicated data comprising a plurality of data blocks referenced for deduplication, said processor system configured to:
   determine the quantity of data of references to each of said data blocks in a context;
   compare the quantity of data of said context to a percentage threshold; and
   store all of said data blocks of said context, where said percentage threshold is exceeded.

27. The system of claim 26, wherein said deduplicated data is arranged in data volumes; wherein said percentage threshold comprises a percentage of quantity of data of a volume; and wherein said processor system is configured to store all said data blocks of said volume where said percentage threshold is exceeded.

28. The system of claim 26, wherein said deduplicated data comprises a defined data stream comprising a plurality of data volumes; wherein said percentage threshold comprises a percentage of the quantity of deduplicated data of said data stream; and wherein said processor system is configured to store all said data of said data stream where said percentage threshold is exceeded.

29. A system comprising:
   at least one data storage drive configured to store data to at least one data storage medium; and
   a processor system configured to back up deduplicated data to a plurality of separate data storage media via said at least one data storage drive, said deduplicated data comprising a plurality of data blocks referenced for deduplication, said processor system configured to:
   determine the references to each of said data blocks;
   compare said references to a first threshold;
   compare said references to a second threshold;
   store a second copy of at least each said data block to said separate data storage media where said first threshold is exceeded; and
   store a copy in addition to said second copy to said separate data storage media of at least each said data block where said second threshold is exceeded.

\* \* \* \* \*